July 28, 1953  C. V. LITTON  2,647,070

METHOD OF MAKING METAL-TO-CERAMIC SEALS

Filed Nov. 17, 1950

INVENTOR
CHARLES V. LITTON
BY
ATTORNEY

Patented July 28, 1953

2,647,070

UNITED STATES PATENT OFFICE 2,647,070

METHOD OF MAKING METAL-TO-CERAMIC SEALS

Charles V. Litton, Redwood City, Calif.

Application November 17, 1950, Serial No. 196,140

2 Claims. (Cl. 154—43)

This invention relates to metal-to-ceramic seals and method of making same, and more particularly to such seals as used in vacuum tubes where the seal is subjected to high operating temperatures.

At present, seals of metal-to-ceramic are generally made by coating the ceramic with metal and brazing the metal thereto. This however is open to the objection that stresses develop between the brazing metal and the metal and ceramic involved, unless the brazing alloy has substantially the same coefficient of expansion as the parts connected.

Another method has been used in effecting such joints which avoids the use of brazing alloys. This joint is made with an intermediate layer of ceramic enamel or glass of appreciable thickness between the parts forming the seal. These techniques, however, suffer from the defect that when appreciable free enamel or glass is present relatively high vapor pressure develops in use. Furthermore, the top operating temperature is limited to the melting point of the enamel or glass layer.

I have discovered that a metal-to-ceramic seal can be made directly by providing a ground fit between the metal and ceramic at the junction and using a very thin coating of enamel, or glass, between the two parts, the seal being effected by heating to a temperature to flux the ceramic and the oxide of the metal so that the coating is all substantially absorbed in the metal-ceramic junction. The amount of enamel or glass is limited to a thickness in the order of .001 to .002 inch.

In practice the metal is reduced in thickness at the vicinity of the junction, particularly if the metal and ceramic do not have the same coefficient of expansion. While it is not necessary to reduce the thickness of the metal when the coefficients of expansion are the same, such reduction is generally beneficial in any case. This is because the use of ceramics is often at a point where the heating is in the ceramic and not in the metal so that the expansion of the two will not be uniform.

Figure 1:
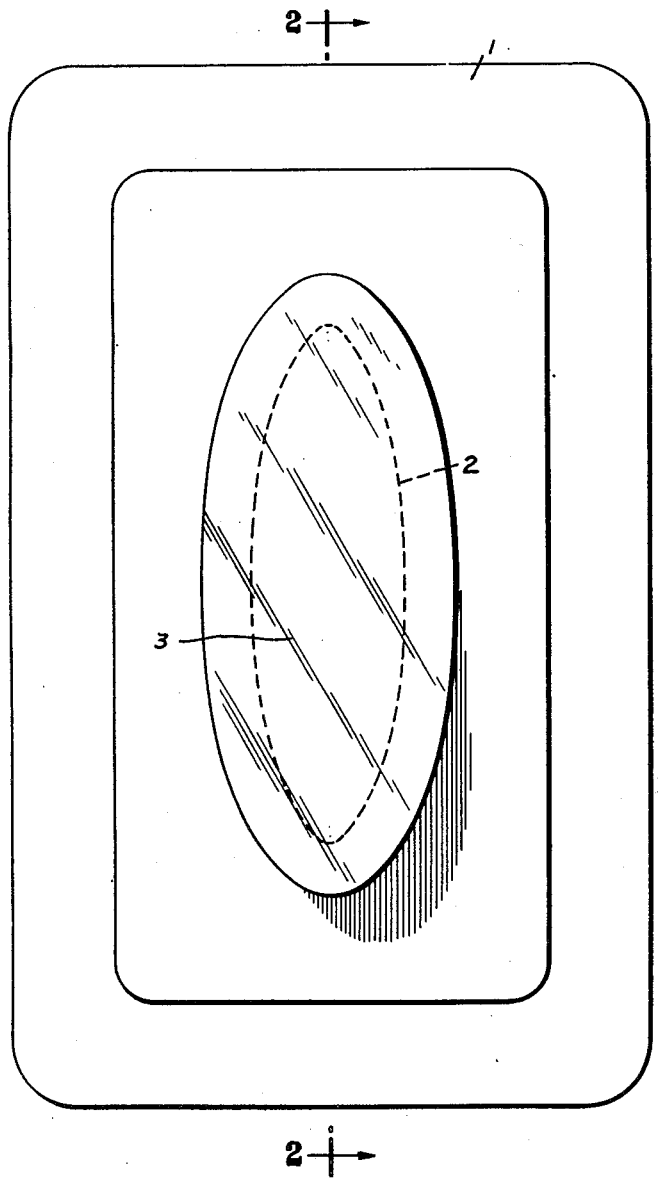
Figure 2:
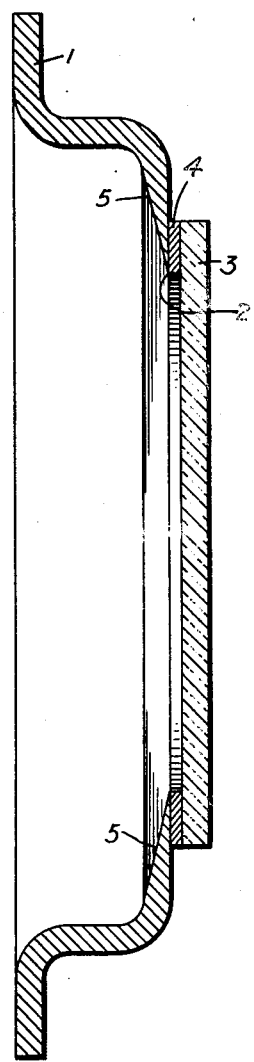

The above mentioned and other features and objects of this invention and the manner of attaining them will become more apparent and the invention itself will be best understood by reference to the following description of the embodiment of the invention taken in conjunction with the accompanying drawings, in which:

Fig. 1 is the front elevational view of a magnetron output window used as an illustrative embodiment of this invention, and Fig. 2 is a cross-sectional view taken along the line 2—2 of Fig. 1.

Turning now to the drawing, a typical application of my invention applied to an output wave guide window for use in a magnetron is illustrated. A metal base plate 1 is shown the dimension being made to fit the end of an output wave guide. Centrally of plate 1 is provided an opening 2 serving as output opening. In order to seal the tube and yet permit transfer of the electromagnetic energy a ceramic window 3 is sealed to the metal plate 1 over the opening. In operation the ceramic is subject to heating by dielectric losses while the metal plate 1 is not. Moreover, the ceramic window may be subject to heavier bombardment due to stray electrons than the plate, and as its conduction is poor the heat will be less readily dissipated than the plate.

In accordance with the invention the seal comprises substantially a direct effective weld between plate 1 and window 3 by use of a material which will adhere to both parts, as for example, ceramic enamel or glass 4, present only as a flux. Preferably the edges of plate 1 adjacent the opening 2 are reduced in thickness as shown at 5 in order to reduce strain caused by different expansion of the metal and ceramics.

The seal is made by obtaining first a very close fit between the edges of plate 1 and window 3. This is preferably a ground fit. The thin coating of the adherent material is then applied between the parts, preferably by coating the metal. This coating is made in the order of .001 to .002 inch thick. The assembly is then heated to a temperature sufficient to flux the metal and ceramic forming in effect a direct weld of the metal and ceramic. Such a seal is found to stand up under temperatures considerably in excess of the melting point of the adherent material. For example, a joint made at a temperature of 300° C. may withstand operating temperatures in excess of 700° C. without failure.

As an adherent material or flux standard types of ceramic enamels and glasses are suitable. As an example, ceramic enamels known as Type DH and Type CAZ made by the Ceramic Color and Chemical Co. of New Bryton, Pa., are found to be suitable. If the metal comprises a low expansion type known as "Kovar" then glass, having low coefficients of expansion such as for example those made by Corning Glass Works, known as "705," and "705A" and "705-2" are satisfactory.

It would be distinctly understood that this invention is not limited to the example shown, but is applicable to many uses. Furthermore, the expression "seal" as used herein is not to be construed in its narrow sense as a gas-tight closure, but may refer to any solid junction made between a metal and a ceramic.

While I have described above the principles of my invention in connection with specific apparatus, it is to be clearly understood that this description is made only by way of example and not as a limitation to the scope of my invention, as set forth in the objects thereof.

What I claim is:

1. The method of effecting a seal between a metal part and a ceramic part which comprises shaping the surfaces of said metal and ceramic in the areas of contact to fit within a tolerance of a ground fit, applying a coating of a fluxing material to a thickness in the order of .001 to .002 inch between the areas of contact of said parts, and heating said area of contact to a temperature sufficient to flux said ceramic and said metal with said material.

2. The method of effecting a seal between a metal part and a ceramic part which comprises shaping the surfaces of said metal and ceramic in the areas of contact to fit within a tolerance of a ground fit, applying a coating of a fluxing material consisting of a material selected from a class comprised of ceramic enamel and glass, to a thickness in the order of .001 to .002 inch between the areas of contact of said parts, placing said parts into contact over said area, and heating said area of contact to a temperature sufficient to flux said ceramic and said metal with said material.

CHARLES V. LITTON.

References Cited in the file of this patent

UNITED STATES PATENTS

| Number | Name | Date |
|---|---|---|
| 1,266,614 | Newcomb | May 21, 1918 |
| 2,241,505 | Cuttler | May 13, 1941 |
| 2,394,984 | Claussen | Feb. 19, 1946 |

OTHER REFERENCES

Hausner Electrical Bushings, reprint from Product Engineering, December 1945 (3 pp.).